Patented Feb. 8, 1938

2,107,307

UNITED STATES PATENT OFFICE 2,107,307

POLYHYDROXY POLY SECONDARY ALKYL PHENOL GERMICIDES

Albert L. Rawlins, Detroit, and Herbert C. Hamilton, Grosse Ile, Mich., assignors to Parke, Davis & Company, Detroit, Mich., a corporation of Michigan No Drawing. Application September 18, 1933, Serial No. 690,026

19 Claims. (Cl. 260—154)

The object of the invention is the preparation of highly potent germicides of the phenolic type, especially compounds which exceed in potency, as measured by phenol coefficients, all phenolic germicides in use at the present time. Another object is the preparation of new compounds which exert a specific action upon certain organisms, especially staphylococci and streptococci, which forms include many of the recognized pathogenic organisms.

It is well known that when an alkyl group is introduced into compounds of the phenolic type as, for example, into phenol, cresol, or resorcinol, products are obtained which possess an enhanced phenol coefficient, the potency increasing with increasing molecular weight of the substituted alkyl or aralkyl group. By this procedure, unfortunately, it has been impossible to obtain compounds possessing coefficients beyond approximately 100 for the reason that with increase in molecular weight of the compounds a decrease in solubility occurs, so that compounds are finally obtained which exert no demonstrable germicidal activity even though a saturated aqueous solution be tested.

The introduction of a single alkyl group into the poly phenol series as, for example, into resorcinol has given somewhat more favorable results, but even here it is generally recognized that the limit of germicidal activity is attained (with a coefficient of possibly 100 to 200) when the alkyl group contains six or seven carbon atoms.

We have found that products possessing unique germicidal properties may be obtained by introducing two or three alkyl groups into polyhydroxy phenols. For this purpose we have studied the alkylation of resorcinol and hydroquinone but one is not limited to the dihydroxy phenols since equally surprising results are obtained with the trihydroxy compounds. This is demonstrated by the derivatives which we have prepared from pyrogallol and which are described below. In addition, a dihexyl derivative of phloroglucinol has also been prepared by us. The reaction appears to be a perfectly general one since no exceptions have been found in the entire series of compounds studied. We have been able to obtain compounds possessing phenol coefficients as high as 1000 to 1200 when tested upon staphylococci and streptococci. It should be pointed out, however, that such compounds are somewhat specific in their germicidal effects, as is shown by the fact that they possess a relatively low potency when tested against bacilli, such as B. coli and B. typhosus. That is not a serious disadvantage, however, since the latter types are of relatively minor importance in the causation of common diseases. We have found, moreover, that the specialized germicides are highly potent also on Diplococcus pneumoniae, Micrococcus catarrhalis, Bacterium diphtheriae and Micrococcus gonorrhoeae, as well as upon Streptococcus hemolyticus and Staphylococcus aureus which have been referred to above.

The process that we have used for the production of poly alkylated poly phenols consists in the condensation of an alcohol with the phenol in the presence of fused zinc chloride in accordance with the procedure to be described. Various alcohols may be used as, for example, ethyl, n-propyl, n-butyl, n-amyl and n-hexyl alcohols, but one is not limited to the primary members. It is likely, moreover, that although a primary alcohol is used initially, the reaction product contains the alkyl group in the form of a secondary alkyl due to the well known tendency of zinc chloride to cause rearrangements. Neither is one limited to alkyl groups of six carbons as is seen by the fact that heptyl and octyl derivatives have been prepared by us. Moreover, aralkyl groups, such as benzyl and phenethyl and other stable substituted alkyls, may be introduced as readily. As yet we have found no exceptions to this general reaction when conducted under the conditions specified. Although we have described compounds containing ethyl, propyl and butyl groups, we find that the derivatives most important therapeutically are those which contain alkyls of more than four carbon atoms. Thus the compounds of our invention may be designated broadly polyalkyl polyhydroxy phenols in which said alkyls are secondary and have the same number of carbon atoms greater than four. The preferred compounds of our invention may be more specifically designated di secondary alkyl poly phenols.

The use of zinc chloride as a condensing agent for the interaction of alcohols with phenols has previously been described (Ber. *14*: 1842, 1881: *15*: 150, 1882; *16*: 792, 1883) but the reaction has not been applied to the poly alkyl poly phenols. Such phenols, however, have been subjected to alkylation through the medium of other alkylating agents as, for example, potassium acid sulfate (German Patent No. 23,775). Such condensation, however, has yielded ethers instead of carbon alkyl compounds although the ether derivatives were assumed to be contaminated with carbon alkylated derivatives.

Dialkyl derivatives of resorcinol have been described (J. Am. Chem. Soc. *48*: 2358, 1926) but such compounds have been produced by the standard method of synthesis which precludes the production of secondary alkyl derivatives, for example, our dihexyl resorcinol differs distinctly in its physical properties from the dihexyl resorcinol described in the above publication. The exceptional germicidal properties of the dialkyl resorcinols containing alkyls with more than four carbon atoms is our discovery, and was previously unknown.

The dihexyl resorcinol prepared by us possesses most probably the Formula (I) and the diamyl pyrogallol, the Formula (II) although the

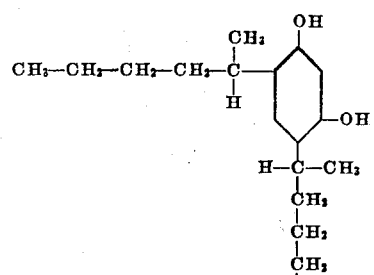

I

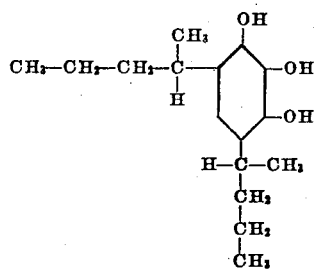

II method of preparation excludes definite proof of structure. Moreover, the compounds may be contaminated with small quantities of the mono-alkyl and trialkyl derivatives although the process of fractional distillation under diminished pressure enables one to collect a fraction which consists almost entirely of the dialkyl compound. In the following examples, the quantities of ingredients are given as molecular proportions.

*Preparation of di secondary amyl derivative of pyrogallol*

The general method of producing pyrogallol derivatives is as follows: One part of pyrogallol, one part of n-amyl alcohol, and one and one-half parts of fused zinc chloride are mixed and refluxed over an oil bath for 1.5 to 2 hours. After cooling the mixture, about 15 parts of water are added and the mixture shaken and warmed on the steam bath until two definite layers are formed. The dark-colored viscous top layer is separated from the remainder and washed three times with equal volumes of water. It is then subjected to vacuum distillation over an air, oil or metal bath. A good yield of amyl pyrogallol is obtained. That the product thus obtained is a carbon substituted amyl pyrogallol is proved by the fact that three hydroxyl groups may be acetylated.

Some of the compounds prepared by the above procedure, together with their boiling points, are as follows:

*Pyrogallol derivatives*

| Alcohol used in condensation | Boiling point of derivative |
|---|---|
| n-Butyl | 136–140° C. at 2 mm. |
| Tertiary butyl | 165–170° C. at 3–4 mm. |
| Tert. amyl | 150–153° C. at 2 mm. |
| n-Amyl | 146–148° C. at 1–1.5 mm. |
| Iso-amyl | 157–159° C. at 2 mm. |
| Sec. amyl (1-methyl butyl) | 157–160° C. at 2 mm. |
| 2-methyl butyl | 146–148° C. at 2 mm. |
| Sec. amyl (1-ethyl propyl) | 154–158° C. at 2 mm. |
| n-Hexyl | 153–155° C. at 1–1.5 mm. |
| n-Heptyl | 160–164° C. at 1–1.5 mm. |
| n-Octyl | 168–172° C. at 1–1.5 mm. |

For the preparation of the resorcinol derivatives we have used a similar method of condensation, a specific example being here given.

*Preparation of di secondary hexyl resorcinol*

One part of resorcinol, one part of n-hexyl alcohol and one and one-half parts of freshly fused zinc chloride are mixed and refluxed over an oil bath for three and one-half to four hours. After cooling, about fifteen parts of water are added and the mixture warmed on the steam bath with constant shaking until two definite layers are formed. The dark-colored, viscous top layer is separated from the remainder and washed three times with equal volumes of water. It is then subjected to vacuum distillation over an air, oil or metal bath. A good yield of the product is obtained. It is a thick, viscous, slightly amber-colored liquid having only a slight odor, and distilling from 178–182° C. at 6–7 mm.

Other derivatives prepared by an exactly analogous procedure are as follows:

*Resorcinol derivatives*

| Alcohol used in condensation | Boiling point of derivative |
|---|---|
| n-Propyl | 156–158° C. at 6–7 mm. |
| n-Amyl | 168–175° C. at 6–7 mm. |
| Sec. amyl (1-methyl butyl) | 119–122° C. at 1 mm. |
| n-Hexyl | 178–182° C. at 6–7 mm. |
| n-Heptyl | 165–175° C. at 2 mm. |
| Ethyl | 135–137° C. at 4–5 mm. |

The corresponding n-hexyl derivative of phloroglucinol boils at 195–205° at 3–4 mm. pressure.

The corresponding hexyl derivative of hydroquinone boils at 153–159° at 2 mm. pressure.

The phenol coefficients of these various poly alkyl poly phenols have been determined by a method analogous to the official U. S. Hygienic Laboratory method except that *Staphylococcus*

*aureus* and *Streptococcus hemolyticus* were substituted in place of *B. typhosus*. The results were as follows:

| Phenol used in condensation | Alcohol used in condensation | Phenol coefficient towards *Staphylococcus aureus* | Phenol coefficient towards *Streptococcus hemolyticus* |
|---|---|---|---|
| Pyrogallol | n-Butyl | 90 | 100 |
| Do | Tert. butyl | 5 | 3 |
| Do | n-Amyl | 200 | 220 |
| Do | Amyl (2-Methyl butyl) | 95 | 145 |
| Do | Iso-amyl | 11 | 15 |
| Do | Tert. amyl | 100 | 100 |
| Do | Sec. amyl (1-methyl butyl) | 215 | 235 |
| Do | Sec. amyl (1-ethyl propyl) | 118 | 190 |
| Do | n-Hexyl | 280 | 320 |
| Do | n-Heptyl | 360 | 375 |
| Do | n-Octyl | 235 | |
| Resorcinol | n-Heptyl | 525 | 525 |
| Do | Sec. amyl (1-methyl butyl) | 190 | 235 |
| Do | n-Propyl | 20 | 25 |
| Do | n-Hexyl | 1000 | 1350 |
| Do | Ethyl | 60 | 65 |
| Hydroquinone | n-Hexyl | 25 | 38 |
| Phloroglucinol | ----do---- | 12 | 125 |

It will be noted from the above table that the dihexyl derivative of resorcinol is the most potent of the listed compounds. The most probable structural formula of this compound has been indicated above.

The poly alkyl derivatives of poly phenols described above and which may be obtained by the process outlined, are only slightly soluble in water, in some instances only to the extent of 1–20,000 to 1–40,000, but they are quite soluble in alcohol, ether, acetone and many other organic solvents. They are conveniently dispensed in alcohol or alcohol-glycerin solutions. When the alcohol-glycerin solutions are poured into water, opalescent colloidal solutions are obtained unless the dilution is higher than 1–20,000.

All of the poly alkyl poly phenols mentioned above are obtained either as colorless or light amber colored, thick, viscous liquids. Some of the compounds, and in particular the pyrogallol derivatives, discolor upon exposure to air due to slight oxidation. When dissolved in alkaline solutions they are oxidized more rapidly. In alcoholic solutions, however, they appear to be comparatively stable. Moreover, the resorcinol derivatives are considerably more stable towards oxidation than the pyrogallol compounds.

It is seen from the above description of our invention that our process has led to the production of compounds possessing unusual germicidal values not previously recognized. Moreover, the compounds are chemically different from those produced by orthodox methods. It is true that the exact chemical structure of the compounds is not known, the structural formulas presented above representing merely the most probable structures. The method of preparation may be modified in various ways, for example, dehydrating agents like magnesium chloride may be substituted for zinc chloride, the time of heating may be varied and the proportions of the ingredients may be adjusted within reasonable limits. The process described is the one which has yielded satisfactory results and which we believe to be the best.

What we claim as our invention is:

1. A germicide comprising essentially a polyalkyl polyhydroxy phenol having two secondary alkyls with the same number of carbon atoms greater than four, a viscous liquid only slightly soluble in water but quite soluble in alcohol, ether and acetone and possessing high phenol coefficient toward *Staphylococcus aureus* and *Streptococcus hemolyticus*.

2. A germicide comprising essentially a polyalkyl pyrogallol having two secondary alkyls with the same number of carbon atoms greater than four, a viscous liquid only slightly soluble in water but quite soluble in alcohol, ether and acetone and possessing high phenol coefficient toward *Staphylococcus aureus* and *Streptococcus hemolyticus*.

3. A germicide comprising essentially a polyalkyl resorcinol having two secondary alkyls with the same number of carbon atoms greater than four, a viscous liquid only slightly soluble in water but quite soluble in alcohol, ether and acetone and possessing high phenol coefficient toward *Staphylococcus aureus* and *Streptococcus hemolyticus*.

4. A germicide comprising essentially a dialkyl resorcinol having two secondary alkyls with the same number of carbon atoms greater than four, a viscous liquid only slightly soluble in water but quite soluble in alcohol, ether and acetone and possessing high phenol coefficient toward *Staphylococcus aureus* and *Streptococcus hemolyticus*.

5. Polyalkyl polyhydroxy phenols having two secondary alkyls with the same number of carbon atoms greater than four.

6. Dialkyl polyhydroxy phenols in which said alkyls are secondary and have the same number of carbon atoms greater than four.

7. Polyalkyl pyrogallol having two secondary alkyls with the same number of carbon atoms greater than four.

8. Polyalkyl resorcinol having two secondary alkyls with the same number of carbon atoms greater than four.

9. Di secondary hexyl resorcinol.

10. Di secondary heptyl resorcinol.

11. Di secondary amyl pyrogallol.

12. A di heptyl resorcinol, a thick viscous liquid having a boiling point from 165° to 175° C. at 2 mm.

13. A di amyl pyrogallol, a thick viscous liquid having a boiling point approximately 154° to 158° C. at 2 mm.

14. A dihexyl resorcinol, a thick viscous, slightly amber-colored liquid distilled from 178–182° C. at 6–7 mm. and possessing high phenol coefficient toward *Staphylococcus aureus* and *Streptococcus hemolyticus*.

15. The process of preparing polyalkyl polyhydroxy phenols comprising the mixing of an alkyl alcohol, a polyhydroxy phenol and fused zinc chloride, refluxing sufficiently to cause at least two alkyl groups from the alkyl alcohol to be introduced into the polyhydroxy phenol, adding water, heating until two layers are formed, removing the viscous top layer and vacuum-distilling the same, thereby obtaining the polyalkyl polyhydroxy phenol as a thick viscous liquid.

16. The process of preparing polyalkyl dihydroxy phenols comprising the mixing of an alkyl alcohol, a dihydroxy phenol and fused zinc chloride, refluxing sufficiently to cause at least two alkyl groups from the alkyl alcohol to be introduced into the dihydroxy phenol, adding water, heating until two layers are formed and removing the viscous top layer and vacuum-distilling the same to obtain a polyalkyl dihydroxy phenol as a thick viscous liquid.

17. The process of preparing a polyalkyl pyrogallol comprising the mixing of an alkyl alcohol having more than four carbon atoms with pyrogallol and fused zinc chloride, refluxing sufficiently to cause at least two alkyl groups from the alkyl alcohol to be introduced into the pyrogallol, adding water, heating until two layers are formed and removing the viscous top layer and vacuum-distilling the same to obtain a polyalkyl pyrogallol as a thick viscous liquid.

18. The process of preparing a polyalkyl resorcinol comprising the mixing of resorcinol, hexyl alcohol and fused zinc chloride, refluxing sufficiently to cause at least two alkyl groups from the hexyl alcohol to be introduced into the resorcinol, adding water, heating until two layers are formed and removing the viscous top layer and vacuum-distilling the same, thereby obtaining the polyalkyl resorcinol as thick viscous liquid.

19. The compound having the formula:

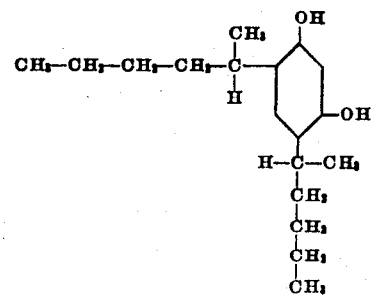

the reaction product of two moles of normal hexyl alcohol with one mole of resorcinol in the presence of zinc chloride and being in one form a thick viscous, slightly amber colored liquid distilling from 178 to 182° C. at 6–7 mm. and possessing high phenol coefficient toward *Staphylococcus aureus* and *Streptococcus hemolyticus*.

ALBERT L. RAWLINS.
HERBERT C. HAMILTON.